United States Patent
Shimizu et al.

(10) Patent No.: US 8,040,543 B2
(45) Date of Patent: Oct. 18, 2011

(54) INSTRUCTION FILE EXECUTION DEVICE, INSTRUCTION FILE EXECUTION METHOD AND JOB FLOW SYSTEM

(75) Inventors: Yasuyuki Shimizu, Ebina (JP); Hitoshi Tsushima, Ebina (JP); Kenji Tsutsumi, Ebina (JP); Takashi Hirata, Ebina (JP); Takayuki Asako, Ebina (JP); Takuya Honda, Ebina (JP); Yukimasa Ishida, Ebina (JP); Hiroshi Yamamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1443 days.

(21) Appl. No.: 11/079,186

(22) Filed: Mar. 15, 2005

(65) Prior Publication Data
US 2006/0070071 A1 Mar. 30, 2006

(30) Foreign Application Priority Data

Sep. 24, 2004 (JP) ................................ 2004-278141

(51) Int. Cl.
*G06F 3/12* (2006.01)
*H04N 1/32* (2006.01)
(52) U.S. Cl. ...................................... 358/1.15; 358/468
(58) Field of Classification Search ................. 358/1.15, 358/79; 705/9, 20, 21, 301, 400, 401, 403, 705/404, 410, 30, 300; 709/201, 202, 203, 709/232, 238; 710/20, 21; 708/105, 110
See application file for complete search history.

(56) References Cited

U.S. PATENT DOCUMENTS

| 5,038,293 | A  | * | 8/1991  | Goodman ........................ 700/233 |
| 6,168,325 | B1 | * | 1/2001  | Nagata ........................ 400/120.01 |
| 6,213,652 | B1 | * | 4/2001  | Suzuki et al. ................. 358/1.15 |
| 6,385,675 | B1 | * | 5/2002  | Yamaguchi ........................ 710/72 |
| 6,411,314 | B1 | * | 6/2002  | Hansen et al. .................. 715/769 |
| 6,728,947 | B1 | * | 4/2004  | Bengston ........................ 717/103 |
| 7,124,094 | B1 | * | 10/2006 | Kobayashi et al. .............. 705/26 |
| 7,150,523 | B2 | * | 12/2006 | Silverbrook et al. .......... 347/104 |
| 7,301,663 | B2 | * | 11/2007 | Ferlitsch ........................ 358/1.15 |
| 7,526,222 | B2 | * | 4/2009  | Fukuda ........................... 399/79 |
| 2001/0024294 | A1 | * | 9/2001 | Tanaka ........................ 358/1.15 |

(Continued)

FOREIGN PATENT DOCUMENTS

JP    A 8-315026    11/1996

(Continued)

OTHER PUBLICATIONS

Notice of Reasons for Rejection issued in Japanese Patent Application No. 2004-278141; Feb. 16, 2010; with English-language translation.

(Continued)

*Primary Examiner* — Jerome Grant, II
(74) *Attorney, Agent, or Firm* — Oliff & Berridge, PLC

(57) ABSTRACT

An instruction file execution device which includes a receiver, a comparison section and a job execution section. The receiver receives an instruction file and a usable money amount, which instruction file describes a job flow which defines linking of a number of jobs. The comparison section compares an execution charge of a job being handled of the jobs of the instruction file received by the receiver with the usable money amount received by the receiver. If the comparison section determines that the usable money amount is greater than or equal to the execution charge, the job execution section executes the job being handled.

21 Claims, 7 Drawing Sheets

U.S. PATENT DOCUMENTS

| | | | |
|---|---|---|---|
| 2001/0056406 A1* | 12/2001 | Nagoya et al. | 705/52 |
| 2002/0001099 A1* | 1/2002 | Okuda et al. | 358/1.15 |
| 2002/0013770 A1* | 1/2002 | Higashi et al. | 705/40 |
| 2002/0026379 A1* | 2/2002 | Chiarabini et al. | 705/26 |
| 2002/0078275 A1* | 6/2002 | Yamaguchi | 710/72 |
| 2002/0087635 A1 | 7/2002 | Yamaguchi et al. | |
| 2002/0131079 A1* | 9/2002 | Forbes et al. | 358/1.15 |
| 2002/0152005 A1* | 10/2002 | Bagnordi | 700/234 |
| 2003/0078863 A1* | 4/2003 | Pilu | 705/34 |
| 2003/0088476 A1* | 5/2003 | Simpson et al. | 705/26 |
| 2003/0090705 A1* | 5/2003 | Ferlitsch | 358/1.15 |
| 2003/0151768 A1* | 8/2003 | Iida | 358/1.15 |
| 2004/0059716 A1 | 3/2004 | Shiraishi et al. | |
| 2004/0088266 A1* | 5/2004 | Briley et al. | 705/401 |
| 2004/0143502 A1* | 7/2004 | McClung, III | 705/14 |
| 2004/0229690 A1* | 11/2004 | Randall | 463/31 |
| 2004/0249733 A1* | 12/2004 | Clough et al. | 705/34 |
| 2005/0065894 A1* | 3/2005 | Inaba | 705/400 |
| 2005/0097020 A1* | 5/2005 | Nomura et al. | 705/35 |
| 2005/0141012 A1* | 6/2005 | Oomura | 358/1.14 |
| 2006/0069647 A1* | 3/2006 | Cozianu et al. | 705/52 |
| 2006/0198653 A1* | 9/2006 | Plewnia et al. | 399/79 |
| 2009/0040554 A1* | 2/2009 | Burke et al. | 358/1.15 |

FOREIGN PATENT DOCUMENTS

| | | |
|---|---|---|
| JP | A 2000-47540 | 2/2000 |
| JP | A 2001-92319 | 4/2001 |
| JP | A 2001-306534 | 11/2001 |
| JP | 2002-169735 | 6/2002 |
| JP | 2003162397 A * | 6/2003 |
| JP | 2004-133926 | 4/2004 |
| JP | A 2004-112514 | 4/2004 |
| JP | A 2004-112636 | 4/2004 |
| JP | A 2004-192037 | 7/2004 |

OTHER PUBLICATIONS

Office Action issued in JP Application No. 2004-278141 on Oct. 12, 2010 (with English translation).

* cited by examiner

INSTRUCTION FILE EXECUTION DEVICE, INSTRUCTION FILE EXECUTION METHOD AND JOB FLOW SYSTEM

CROSS-REFERENCE TO RELATED APPLICATION

This application claims priority under 35 USC 119 from Japanese Patent Application No. 2004-278141, the disclosure of which is incorporated by reference herein.

BACKGROUND OF THE INVENTION

1. Field of the Invention

The present invention relates to an instruction file execution device and method and to a job flow system and more particularly, where various devices are connected to one another by a network, relates to an instruction file execution device, instruction file execution method and job flow system for linking services provided by the various devices and applying processing to document data.

2. Description of the Related Art

It is known to provide technologies relating to distributed processing systems, in which programs and services (functions) distributed over a network are linked and processing sequences are executed. When input/output functions and programs which are operated on various devices connected to a network are to be combined for linked processing corresponding to usage processes of individual users, the network linking apparatus propagates linked processing data between the various linked devices in accordance with a processing sequence.

Specifically, in office environments and the like, there is a distributed processing-type document processing network system in which a scanner, a facsimile device, a photocopier, a multifunction device which incorporates these functions, personal computers, a mail server and suchlike are connected to one another by a network and services provided by these various devices are linked for processing document data. This document processing network system performs linked processing by sequentially propagating linking information, which includes linking relationships between various services, input/output information and the like, between the devices that provide the services. Such linking information is referred to as a job flow service.

Heretofore, there have been structures which charge for individual jobs. However, there have not been structures which charge for individual job flow services.

Now, if application of a conventional structure for charging for individual jobs to a structure for charging for job flow services is attempted without modification, when respective jobs are executed at different devices, it is necessary to charge at each device. Thus, for example, in a case in which coin kits are installed at the respective devices which process a job flow service and charging is implemented by the coin kits, a user would have to insert money at each device before launching the job flow. Thus, there has been a problem in that operations are made extremely inconvenient for users.

SUMMARY OF THE INVENTION

The present invention has been made in view of the above circumstances.

A first aspect of the present invention is an instruction file execution device which includes: a receiver which receives an instruction file and a usable credit amount, the instruction file describing a job flow which defines linking of a plurality of jobs; a comparison section which compares an execution charge of a job being handled of the jobs of the instruction file received by the receiver with the usable credit amount received by the receiver; and a job execution section which, if the comparison section determines that the usable credit amount is greater than or equal to the execution charge, executes the job being handled.

A second aspect of the present invention is a job flow system which includes: the first aspect of the present invention; a charge collection apparatus for collecting a charge; and an instruction apparatus which gives notification of a charge collected at the charge collection device to the instruction file execution device, to serve as the usable credit amount, and which sends a predetermined instruction file to the instruction file execution device.

BRIEF DESCRIPTION OF THE DRAWINGS

Embodiments of the present invention will be described in detail based on the following figures, wherein.

DETAILED DESCRIPTION OF THE INVENTION

Below, embodiments of the present invention will be described in detail with reference to the drawings.

Figure 1:
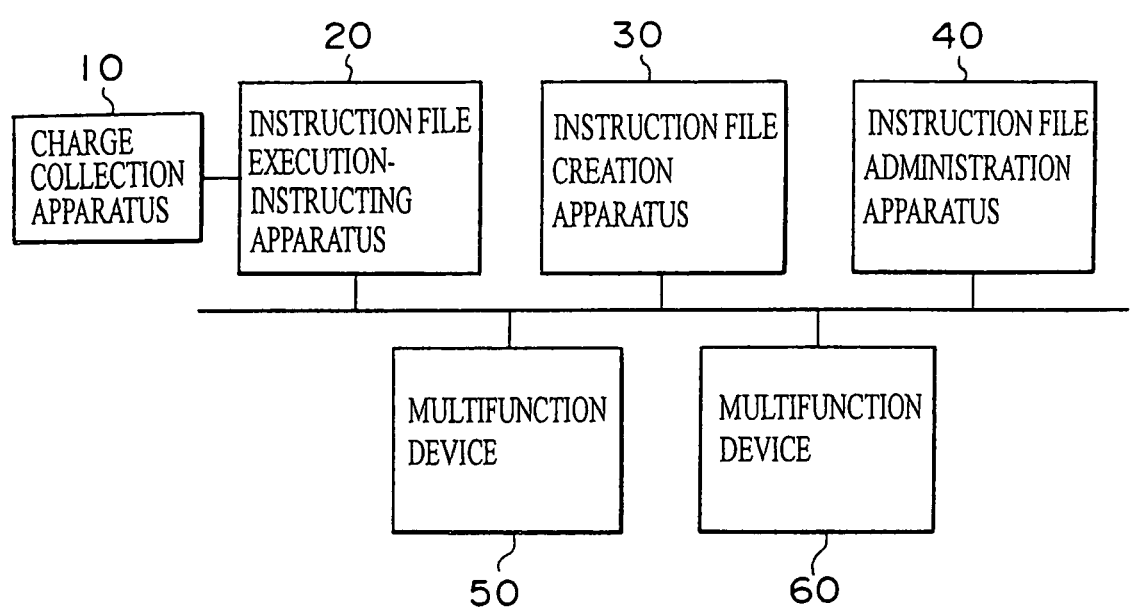
FIG. 1 is a block diagram showing structure of a job flow service system relating to a first embodiment of the present invention.

FIG. 1 is a block diagram showing structure of a job flow service system relating to a first embodiment of the present invention.

The job flow service system is a structure which, in a system in which services which apply respective predetermined processes to documents are connected over a network, links various services relating to a document and executes the various services as a sequence of linked processing (a job flow service). A document is data relating to a text, may include image data, text data and the like, and is not especially limited.

Herein, a file which represents a job flow service, which defines linked processing of services with a view to automation and consistency, is referred to as an instruction file. Services means processes (functions) relating to documents, such as printing, scanning, copying, OCR, e-mail transmission, arrangement in folders, and so forth, but is not especially limited.

The job flow service system is equipped with a charge collection apparatus 10, an instruction file execution-instructing apparatus 20, an instruction file creation apparatus 30, an instruction file administration apparatus 40, and multifunction devices 50 and 60. The charge collection apparatus 10 collects fees from users. The instruction file execution-instructing apparatus 20 instructs execution of instruction files. The instruction file creation apparatus 30 creates the instruction files. The instruction file administration apparatus 40 collects and centrally administers the instruction files. The multifunction devices 50 and 60 execute predetermined jobs of job flow services in accordance with the instruction files.

These devices are connected to one another by a network, and the multifunction device 50 and the multifunction device 60 have similar structures. In addition to the structures mentioned above, for example, a printer, a scanner, a facsimile device, and computers at which application programs are installed may be respectively connected to the network.

The present embodiment will be described as a structure in which the instruction file execution-instructing apparatus 20 and the multifunction devices 50 and 60 are separate devices. However, the present invention is also applicable to a case in which the instruction file execution-instructing apparatus 20 is incorporated in the multifunction devices 50 and 60.

The charge collection apparatus 10 corresponds to a "coin kit", a dispenser or the like, and is an apparatus which collects fees from users. The charge collection apparatus 10 may be provided as a single physical box, or there may be a plurality of the charge collection apparatus 10. Further, the charge collection apparatus 10 is not limited to the structures mentioned above and may be, for example, a reading device which reads charging information recorded at a recording medium, such as a magnetic card or the like.

The instruction file execution-instructing apparatus 20 corresponds to a "control panel", and includes a display section, which displays a plurality of instruction files, and an operation section, for selection of a desired instruction file from the instruction files that are displayed at the display section. Whether the display section and the operation section are structured as a single body or otherwise is not significant.

The instruction file creation apparatus 30 creates files representing details of job flow services corresponding to operations by users. Hence, the instruction files created by the instruction file creation apparatus 30 are collected at the instruction file administration apparatus 40.

The multifunction device 50 and the multifunction device 60 are examples of an instruction file execution device. When the multifunction device 50 or the multifunction device 60 receives an instruction file, the multifunction device 50 or 60 executes a predetermined job of a job flow service described in that instruction file.

Figure 2:
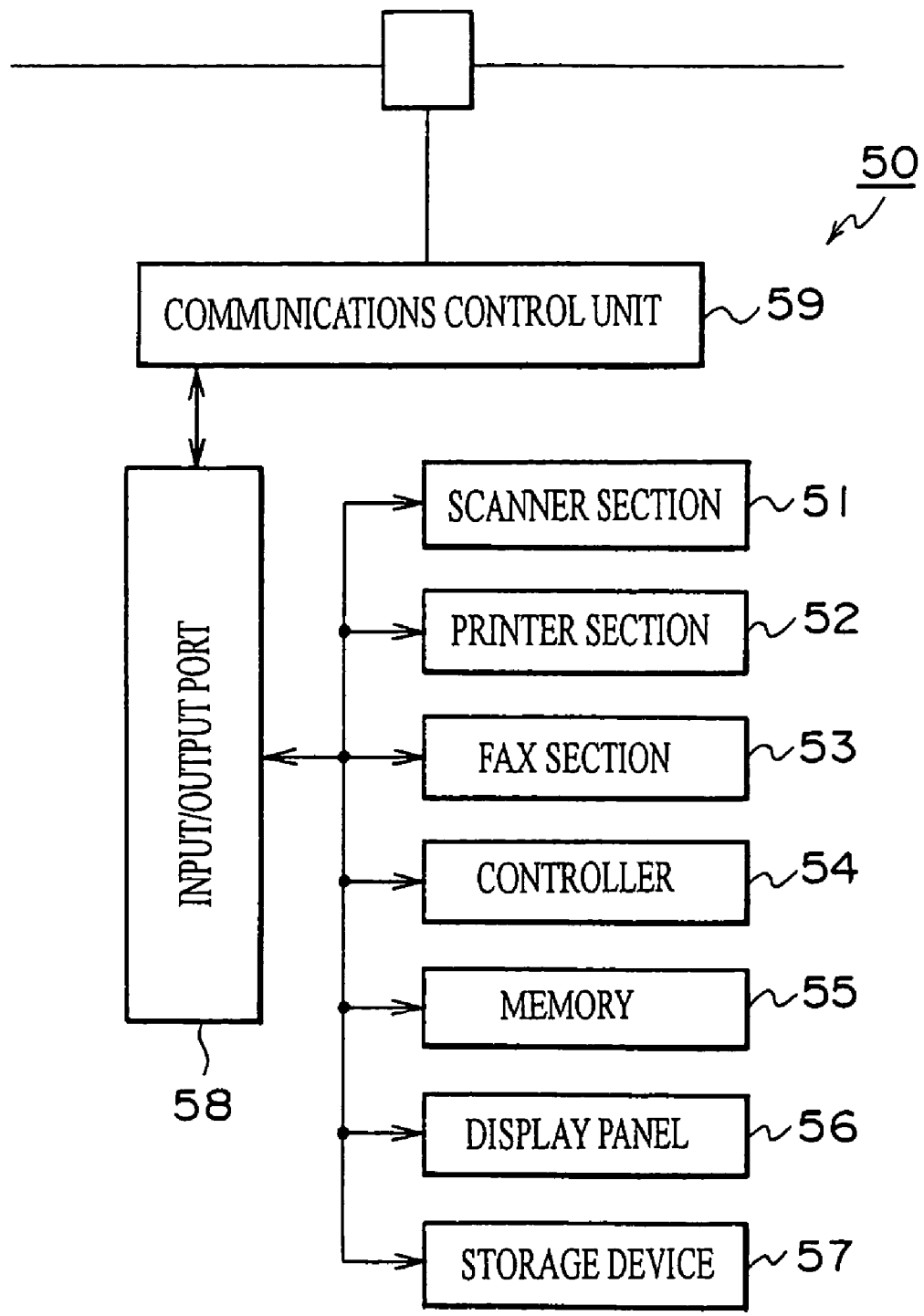
FIG. 2 is a block diagram showing structure of a multifunction device.

FIG. 2 is a block diagram showing structure of the multifunction device 50. The multifunction device 50 includes functions for processing services such as printing, facsimile transmission, copying and the like. The multifunction device 50 administers costs of services thereof.

The multifunction device 50 is equipped with a scanner section 51, a printer section 52 and a facsimile (hereafter shortened to "fax") section 53. The scanner section 51 reads in images that have been recorded on originals. The printer section 52 records electrostatic latent images on a photosensitive body, develops the electrostatic latent images with monochrome toner or color toner, transfers the developed images to recording paper, and outputs the recording paper. The fax section 53 carries out transmission and reception of facsimile documents.

The multifunction device 50 is further equipped with a controller 54, memory 55, a display panel 56, a storage device 57, an input/output port 58 and a communications control unit 59. The controller 54 performs overall control of the multifunction device 50. The memory 55 memorizes image data read in by the scanner section 51, image data received through the network, data of documents received by fax, and so forth. The display panel 56 displays an operation screen including icons and inputs operational information in accordance with touch-operation of the icons. The storage device 57 stores instruction files and the like. The input/output port 58 is for inputting and outputting data. The communications control unit 59 implements communication with devices which are connected to the network.

The scanner section 51, the printer section 52, the fax section 53, the controller 54, the memory 55, the display panel 56, the storage device 57 and the input/output port 58 are connected to one another by a bus. The input/output port 58 is connected through the communications control unit 59 to the network. Note that the scanner section 51 may be combined with the fax section 53 to form a single section.

Figure 3:
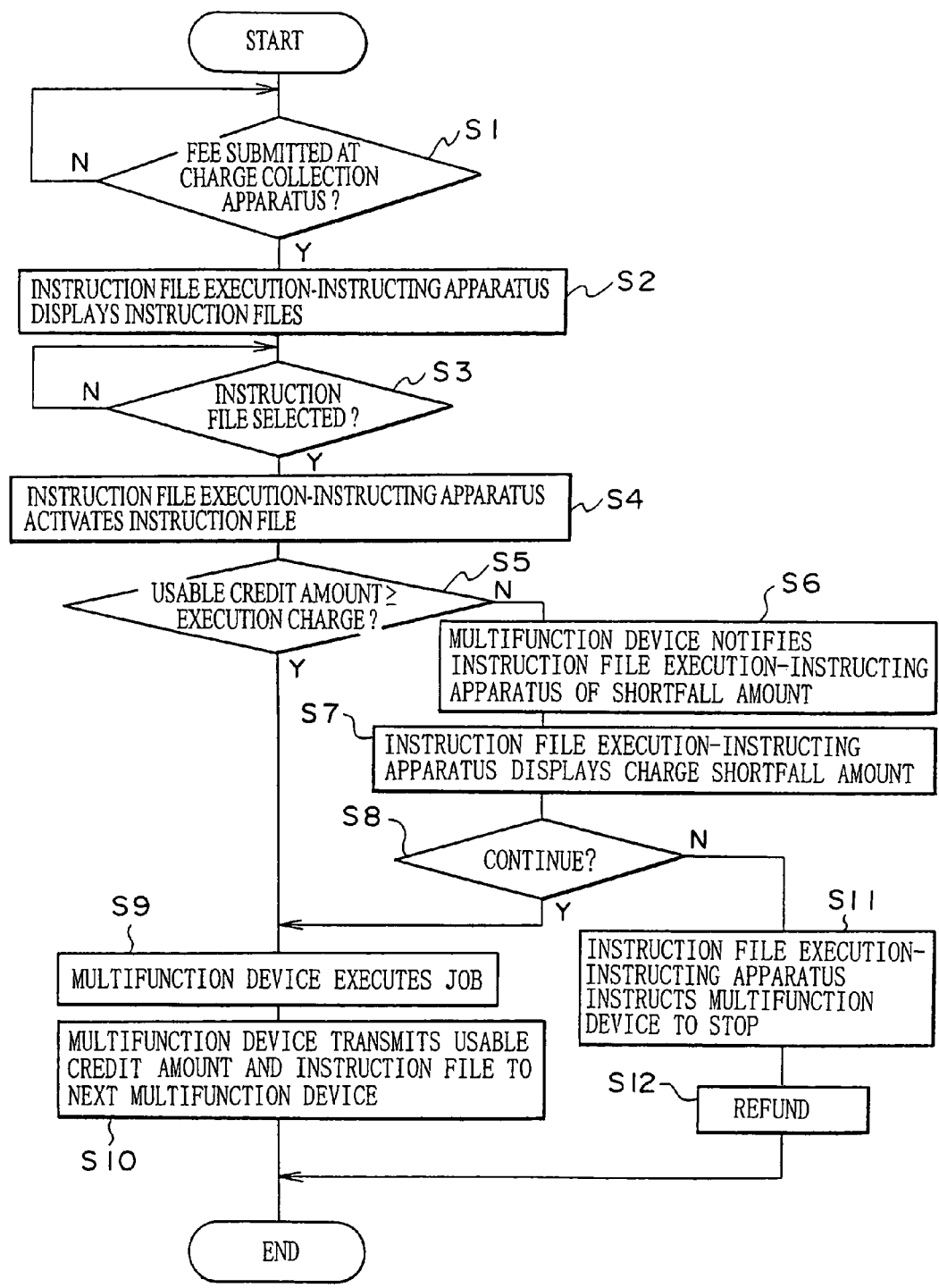
FIG. 3 is a flowchart showing a sequence of execution of an instruction file at the job flow service system.

FIG. 3 is a flowchart showing a sequence of execution of an instruction file in the job flow service system. That is, the job flow service system executes the following processing from step S1 onward.

The charge collection apparatus 10 senses whether or not money has been submitted (step S1). When the charge collection apparatus 10 senses that money has been submitted, the charge collection apparatus 10 gives notification that the money has been submitted to the instruction file execution-instructing apparatus 20.

When the instruction file execution-instructing apparatus 20 receives notification of the submission of money from the charge collection apparatus 10, the instruction file execution-instructing apparatus 20 displays instruction files registered in the instruction file administration apparatus 40 at the display section (step S2). Hence, a user can select a desired instruction file from among the instruction files displayed at the display section by operating the operation section of the instruction file execution-instructing apparatus 20. When an instruction file is selected (step S3), the instruction file execution-instructing apparatus 20 activates the selected instruction file (step S4). The instruction file execution-instructing apparatus 20 sends this instruction file to the multifunction device 50 and gives notice to the multifunction device 50 of a usable credit amount (the money that has been submitted at the charge collection apparatus 10).

The multifunction device 50 reads an execution charge for a job that is to be a subject of the multifunction device 50 from the instruction file, and determines whether or not the usable credit amount is greater than or equal to the execution charge (step S5). Then, if the usable credit amount is not greater than or equal to the execution charge, the multifunction device 50 notifies the instruction file execution-instructing apparatus 20 of a shortfall amount of the usable credit amount (step S6).

The instruction file execution-instructing apparatus 20 displays a message that the credit is insufficient at the display section (step S7) and enters a state of waiting for input regarding whether the money is to be supplemented and the job flow service continued or if the job flow service is to be interrupted.

The instruction file execution-instructing apparatus 20 determines whether or not the job flow service is to continue (step S8). Specifically, if the shortfall amount is submitted at the charge collection apparatus 10 and an operation meaning that the job flow service is to continue is performed at the operation section, the instruction file execution-instructing apparatus 20 determines that the job flow service is to continue. Alternatively, if an operation meaning that the job flow service is to be stopped is performed at the operation section, the instruction file execution-instructing apparatus 20 determines that the job flow service is to stop. The instruction file execution-instructing apparatus 20 may also determine that the job flow service is to be stopped if neither of the above operations is carried out within a predetermined amount of time.

When the usable credit amount is greater than or equal to the execution charge (a positive judgement in step S5) or when the instruction file execution-instructing apparatus 20 determines that the job flow service is to continue (a positive judgement in step S8), the multifunction device 50 activates the job being handled of the multifunction device 50 from the job flow service described in the instruction file, and executes the job (step S9). After execution of the job, the multifunction device 50 subtracts the execution charge from the usable credit amount and calculates a new value of the usable credit amount. The multifunction device 50 sends this usable credit amount and the instruction file to an instruction file execution device that is to execute a next job (for example, the multifunction device 60) (step S10). The usable credit amount may be described within the instruction file, and the usable credit amount may be transmitted to the instruction file execution device that is to execute the next job separately from the instruction file.

Hence, after one job of the job flow service described in the instruction file has been executed at the multifunction device 50, the next job of the job flow service is executed, for example, at the multifunction device 60. The processing from step S5 to step S12 is repeatedly executed for the rest of the job flow service.

On the other hand, if it is determined that the job flow service is not to continue (i.e., will stop) (a negative judgement in step S8), the instruction file execution-instructing apparatus 20 instructs the multifunction device 50 to stop execution of the job (step S1) and controls the charge collection apparatus 10 so as to refund the current usable credit amount (step S12).

As described above, the job flow service system relating to the first embodiment is capable of charging for the whole of a job flow service described in an instruction file, by a user simply inserting a fee at the charge collection apparatus 10 and selecting a desired instruction file.

In a case in which the submitted payment is insufficient, the job flow service system is capable of charging for the whole of the job flow service by executing jobs to an extent for which the payment is sufficient and then prompting the user to submit payment for an amount of insufficiency.

Now, in the present embodiment, the multifunction device 50 judges for a shortfall of the usable credit amount before executing a job. However, the present invention is not limited thus. For example, the multifunction device 50 could judge for a shortfall in the usable credit amount and subtract an execution charge from the usable credit amount during execution of a job (before the job is completed).

Further, in step S6, the multifunction device 50 may, instead of giving notification of a shortfall amount to the instruction file execution-instructing apparatus 20, forcibly stop the execution of a job or stop execution of a timed-out job. This is useful when, for example, the multifunction device 50 is provided in a store and a user goes away from the multifunction device 50 without making up a payment shortfall.

Further again, the multifunction device 50 may, in addition to giving notification of a shortfall amount to the instruction file execution-instructing apparatus 20 in step S6, give notification of the shortfall amount to a pre-specified terminal device. Consequently, if a user is at the terminal device, the user can verify that there is a shortfall in the amount of money even if the user is distant from the multifunction device 50.

Further still, the instruction file execution-instructing apparatus 20 may control the charge collection apparatus 10 in step S12 so as to refund the amount of usable credit at that time, and could refund payments for the whole of a job flow service, including jobs which have already been executed. For example, in a case in which the final job in a job flow service is an e-mail transmission, a file transfer, a facsimile transmission, a printout or the like, if the job flow service is stopped, the results of any jobs that were executed prior to stopping may be worthless. In such a case, as described above, fees for the whole of the job flow service including jobs that have already been executed can be refunded. The refunding process may have, for example, the form described below.

For example, in step S10, the multifunction device 50 may, as well as the usable credit amount, send information representing whether or not the results of the job whose execution has finished have value for the user to the next instruction file execution device, the multifunction device 60. Then, if the judgement of step S5 at the multifunction device 60 is negative, the multifunction device 60 may, in accordance with information representing whether or not the results of executed jobs have value for the user, determine whether to refund the whole amount of money or to refund an amount corresponding to unexecuted jobs, and then give notification of the result of this determination to the instruction file execution-instructing apparatus 20 in step S6.

As another refunding process, the instruction file execution-instructing apparatus 20 may analyze the instruction file, determine whether or not the results of jobs that were executed before stopping have value for the user, and control the charge collection apparatus 10 so as to refund money for the whole of the job flow service if the results do not have value. If the results do have value, the instruction file execution-instructing apparatus 20 may control the charge collection apparatus 10 as in step S12 described above.

Next, a second embodiment of the present invention will be described. Note that portions that are the same as in the first embodiment are assigned the same reference numerals, and duplicative descriptions will be omitted.

Figure 4:
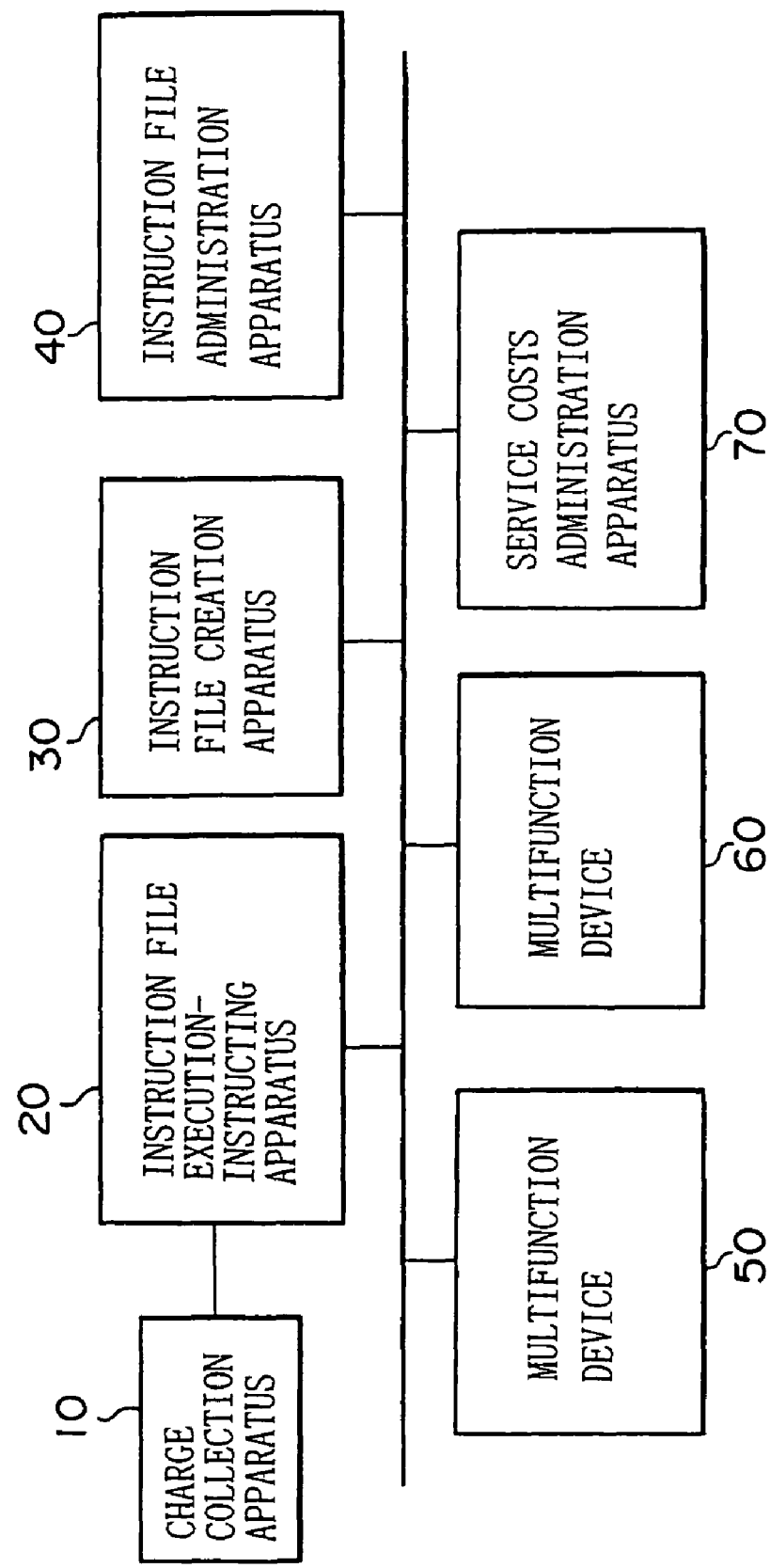
FIG. 4 is a block diagram showing structure of a job flow service system relating to a second embodiment of the present invention.

FIG. 4 is a block diagram showing structure of a job flow service system relating to the second embodiment of the present invention. This job flow service system is a system in which a service costs administration apparatus 70 is added to the structure shown in FIG. 1.

Figure 5:
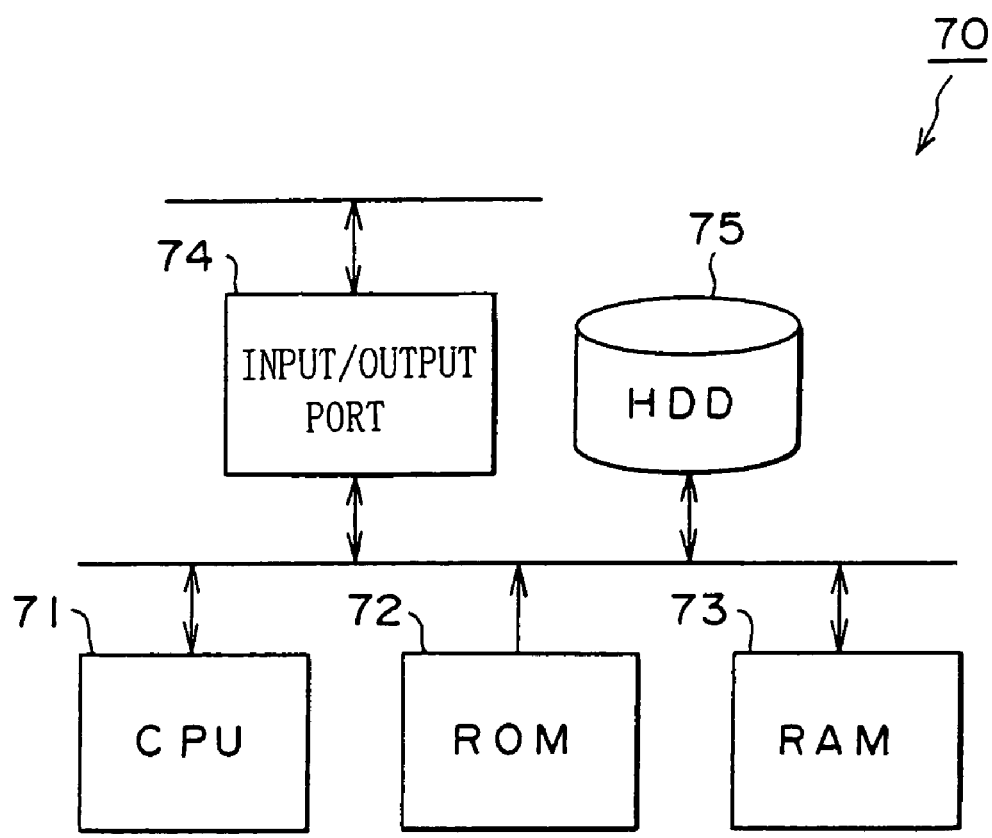
FIG. 5 is a block diagram showing structure of a service costs administration apparatus.

FIG. 5 is a block diagram showing structure of the service costs administration apparatus 70. The service costs administration apparatus 70 is equipped with a CPU 71, a ROM 72, a RAM 73, an input/output port 74 and a hard disk drive 75. The CPU 71 performs predetermined operational processes, such as calculations comparing usable credit amounts with execution charges and the like. The ROM 72 stores a control program for the CPU 71. The RAM 73 is a data work area. The input/output port 74 is for implementing reception and transmission of information through a network. The hard disk drive 75 stores various kinds of information which has been inputted through the input/output port 74, such as a usable credit amount and the like.

Figure 6A:
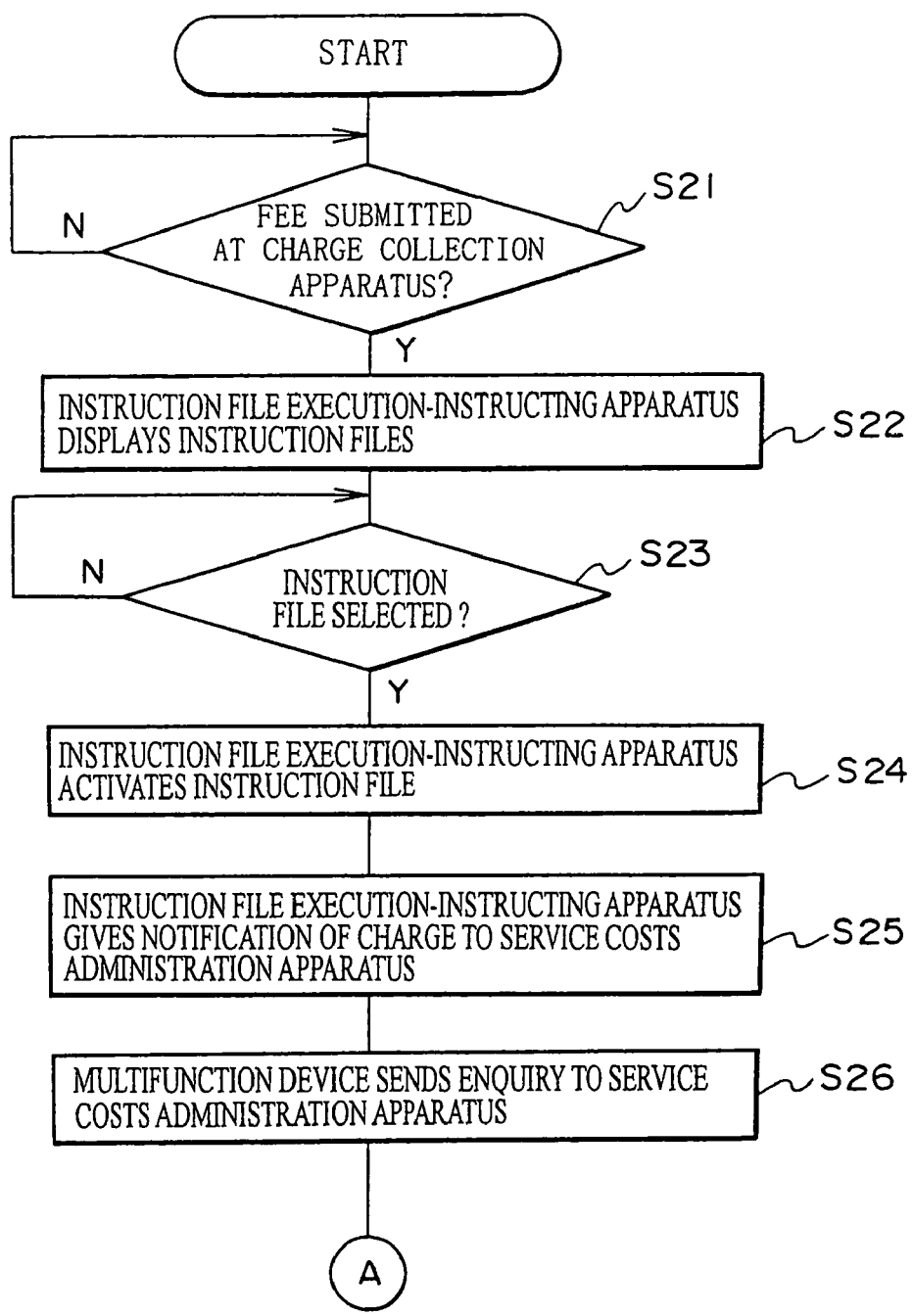
FIGS. 6A and 6B are flowcharts showing a sequence of execution of an instruction file at the job flow service system.
Figure 6B:
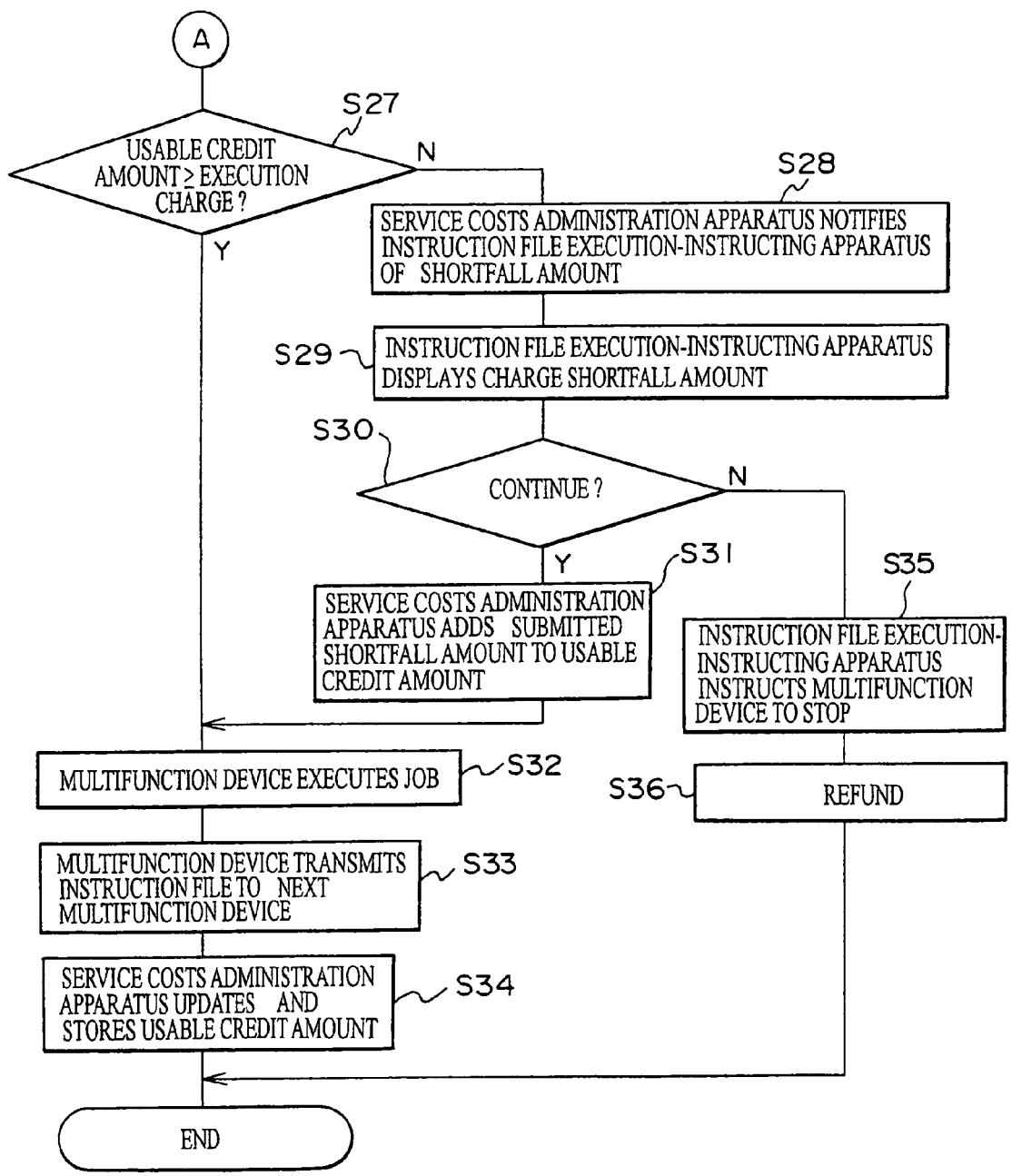

FIGS. 6A and 6B are flowcharts showing a sequence of execution of an instruction file in this job flow service system. That is, the job flow service system executes the following processing from step S21 onward.

Steps S21 to S24 are the same as steps S1 to S4 of FIG. 3. When the processing of steps S21 to S24 has finished, the instruction file execution-instructing apparatus 20 notifies the service costs administration apparatus 70 of the payment that has been submitted at the charge collection apparatus 10 (step S25).

Meanwhile, the multifunction device 50 reads an execution charge for a job being handled of the multifunction device 50 from the instruction file, and sends an enquiry to the service costs administration apparatus 70 regarding whether there is enough credit left for execution of the job (step S26).

When the service costs administration apparatus 70 receives this enquiry from the multifunction device 50, the service costs administration apparatus 70 determines whether or not the usable credit amount is greater than or equal to the execution charge, and notifies the multifunction device 50 of the result of this judgement (step S27). Then, if the usable credit amount is not greater than or equal to the execution charge, the service costs administration apparatus 70 notifies the instruction file execution-instructing apparatus 20 of the shortfall amount of the usable credit amount (step S28).

The instruction file execution-instructing apparatus 20 displays a message that the credit is insufficient at the display section (step S29) and enters a state of waiting for input regarding whether the money is to be supplemented and the job flow service continued or if the job flow service is to be interrupted.

The instruction file execution-instructing apparatus 20 determines whether or not the job flow service is to continue (step S30). Specifically, if the shortfall amount is submitted at the charge collection apparatus 10 and an operation meaning that the job flow service is to continue is performed at the operation section, the instruction file execution-instructing apparatus 20 determines that the job flow service is to continue and notifies the service costs administration apparatus 70 that the shortfall amount has been submitted. Alternatively, if an operation meaning that the job flow service is to be stopped is performed at the operation section, the instruction file execution-instructing apparatus 20 determines that the job flow service is to stop. The instruction file execution-instructing apparatus 20 may also determine that the job flow service is to be stopped if neither of the above operations is carried out within a predetermined amount of time.

If the judgement of step S30 is positive, the service costs administration apparatus 70 adds the payment amount that has been submitted at the charge collection apparatus 10 to the usable credit amount to update the usable credit amount (step S31).

When the multifunction device 50 receives notification that the usable credit amount is greater than or equal to the execution charge (a positive judgement in step S27) or when the usable credit amount has been updated (step S31), the multifunction device 50 activates the job being handled of the multifunction device 50 from the job flow service described in the instruction file, and executes the job (step S32). Then, after completion of the job, the multifunction device 50 sends the instruction file to an instruction file execution device that is to execute a next job (for example, the multifunction device 60) (step S33).

After the multifunction device 50 has executed the job, in order to update the usable credit amount, the service costs administration apparatus 70 subtracts the execution charge from the usable credit amount to calculate a new value for the usable credit amount, and stores this usable credit amount (step S34).

Hence, after one job of the job flow service described in the instruction file has been executed at the multifunction device 50, the next job of the job flow service is executed at, for example, the multifunction device 60. The processing from step S26 onward is repeatedly executed for the rest of the job flow service.

On the other hand, if it is determined that the job flow service is not to continue (i.e., will stop) (a negative judgement in step S30), the instruction file execution-instructing apparatus 20 instructs the multifunction device 50 to stop execution of the job (step S35) and controls the charge collection apparatus 10 so as to refund the current usable credit amount (step S36).

As described above, the job flow service system relating to the second embodiment is capable of charging for the whole of a job flow service described in an instruction file, by a user simply inserting money at the charge collection apparatus 10 and selecting a desired instruction file.

In a case in which the submitted payment is insufficient, the job flow service system is capable of charging for the whole of the job flow service by executing jobs to an extent for which the payment is sufficient and then prompting the user to submit payment for an amount of insufficiency.

Now, in the present embodiment, the service costs administration apparatus 70 judges for a shortfall of the usable credit amount before execution of a job. However, the present invention is not limited thus. For example, the service costs administration apparatus 70 could judge for a shortfall in the usable credit amount and subtract an execution charge from the usable credit amount during execution of a job.

Further, in step S28, the service costs administration apparatus 70 may, instead of giving notification of a shortfall amount to the instruction file execution-instructing apparatus 20, forcibly stop the execution of a job or stop execution of a timed-out job. This is useful when, for example, the multifunction device 50 is provided in a store and a user goes away from the multifunction device 50 without making up a payment shortfall.

Further again, the service costs administration apparatus 70 may, in addition to giving notification of a shortfall amount to the instruction file execution-instructing apparatus 20 in step S28, give notification of the shortfall amount to a prespecified terminal device. Consequently, if a user is at the terminal device, the user can verify that there is a shortfall in the amount of money even if the user is distant from the multifunction device 50.

Further still, the instruction file execution-instructing apparatus 20 may control the charge collection apparatus 10 in step S36 so as to refund the amount of usable credit at that time, and could refund payments for the whole of a job flow service, including jobs which have already been executed.

As described above, some embodiments of the invention are outlined below.

In one embodiment of this invention, the instruction file execution device includes: the receiver which receives an instruction file and a usable credit amount, the instruction file describing a job flow which defines linking of a plurality of jobs; the comparison section which compares an execution charge of a job being handled of the jobs of the instruction file received by the receiver with the usable credit amount received by the receiver; and the job execution section which, if the comparison section determines that the usable credit amount is greater than or equal to the execution charge, executes the job being handled.

The receiver receives an instruction file and a usable credit amount. The instruction document describes a job flow, which defines linking of a plurality of jobs. The usable credit amount means a limit on an amount of money which can be used when jobs are to be executed.

The comparison section compares a charge for execution of a job being handled, from among the respective jobs of the instruction file received by the receiver, with the usable credit amount. A time at which the comparison section compares the execution charge with the usable credit amount may be before the job execution section commences execution of the job and may be between commencement of the job and completion of the job.

If the usable credit amount is greater than or equal to the execution charge, the job execution section executes the job being handled.

Therefore, it is possible to reliably apply charges by comparing, from among execution charges of respective jobs of an instruction file, the execution charge of a job being handled with a usable credit amount and executing the job being handled as long as the usable credit amount is not less than the execution charge.

The instruction file execution device may further include a notification section which, if the usable credit amount is less than an execution charge according to a result of comparison at the comparison section, gives notification of a shortfall amount of the usable credit amount to a predetermined terminal device. Therefore, when there is a shortfall, it is possible to prompt a user to make up the amount of the shortfall.

At such a time, the job execution section may execute the job being handled when the shortfall amount has been collected at a charge collection apparatus. Therefore, even when there is an initial shortfall in payment, it is possible to continue execution of the job flow when a user has made up the shortfall amount at the charge collection apparatus.

In another embodiment of this invention, the job flow system includes: the instruction file execution device; the charge collection apparatus for collecting a charge; and the instruction apparatus which gives notification of a charge collected at the charge collection device to the instruction file execution device, to serve as the usable credit amount, and which sends a predetermined instruction file to the instruction file execution device.

The charge collection apparatus is not limited to, for example, an apparatus which collects money in the form of coins, notes and the like. The charge collection apparatus may be a reading apparatus which reads payment information recorded at a recording medium such as a magnetic card or the like. Furthermore, the present invention is not limited to monetary charges, and could limit usage amounts by the provision of upper limits on numbers of possible uses or the like.

Thus, the present invention can reliably apply charges by comparing, among execution charges of respective jobs in an instruction file, the execution charge of a job being handled with a usable credit amount and executing the job being handled as long as the usable credit amount is not less than the execution charge.

Obviously, the present invention is not limited to the embodiments described above, and can be applied to structures with designs which are modified within the scope described in the claims.

What is claimed is:

1. An instruction file execution device for use with an instruction file and a usable credit amount, the device comprising:
a receiver which receives the instruction file and the usable credit amount, the instruction file describing a job flow which defines linking of a plurality of jobs that are executed by a plurality of devices;
a comparison section which compares an execution charge of a job that is to be executed within the instruction file execution device of the plurality of jobs included in the instruction file with the usable credit amount;
a job execution section which, if the comparison section determines that the usable credit amount is greater than or equal to the execution charge, executes the job within the instruction file execution device, and if the comparison section determines that the usable credit amount is less than the execution charge, refunds charges for the job flow including jobs that have already been executed by other instruction file execution devices of the plurality of devices; and
a sending section which, after execution of the job, calculates a new value of the usable credit amount by subtracting the execution charge from the usable credit amount, and which sends the new value of the usable credit amount and the instruction file to another instruction file execution device that executes a next job.

2. The instruction file execution device of claim 1, further comprising a notification section which, if the usable credit amount is less than the execution charge according to a result of comparison by the comparison section, gives notification of a shortfall amount of the usable credit amount to a predetermined terminal device.

3. The instruction file execution device of claim 2, wherein the job execution section executes the job being handled when the shortfall amount has been collected at a charge collection apparatus.

4. The instruction file execution device of claim 1, wherein the comparison section compares the execution charge with the usable credit amount at least one of before the job execution section commences execution of the job and after commencement of the job but before completion of the job.

5. The instruction file execution device of claim 1, wherein jobs that are executed by the instruction file execution device include at least one of copying, scanning, printing and facsimile communication.

6. The instruction file execution device of claim 1, wherein the job execution section forcibly stops the job when a user does not make a payment within a predetermined time.

7. The instruction file execution device of claim 1, wherein when the comparison section determines that the usable credit amount is less than the execution charge, a user is prompted to submit payment for the amount necessary to fully complete the job.

8. An instruction file execution method for use with an instruction file and a usable credit amount, the method comprising:
receiving the instruction file and the usable credit amount, the instruction file describing a job flow which defines linking of a plurality of jobs that are executed by a plurality of devices;
comparing an execution charge of a job that is to be executed within the instruction file execution device of the plurality of jobs included in the received instruction file with the received usable credit amount;
if the comparison determines that the usable credit amount is greater than or equal to the execution charge, executing the job within the instruction file execution device, and if the comparison section determines that usable credit amount is less than the execution charge, refunding charges for the job flow including jobs that have already been executed by other instruction file execution devices of the plurality of devices; and
after executing the job, calculating a new value of the usable credit amount by subtracting the execution charge from the usable credit amount, sending the new value of the usable credit amount and the instruction file to another instruction file execution device that executes a next job.

9. The instruction file execution method of claim 8, further comprising:
if the usable credit amount is less than the execution charge according to a result of the comparison giving notification of a shortfall amount of the usable credit amount to a predetermined terminal device.

10. The instruction file execution method of claim 9, wherein the job being handled is executed when the shortfall amount has been collected at the charge collection apparatus.

11. The instruction file execution method of claim 8, wherein the comparison of the execution charge with the usable credit amount is performed at least one of before execution of the job commences and after commencement of the job but before completion of the job.

12. The instruction file execution method of claim 8, further comprising forcibly stopping the job when a user does not make a payment within a predetermined time.

13. The instruction file execution method of claim 8, further comprising prompting a user to submit payment for the amount necessary to fully complete the job when usable credit amount is determined to be less than execution charge.

14. A job flow system comprising:
   an instruction file execution device including a receiver which receives an instruction file and a usable credit amount, the instruction file describing a job flow which defines linking of a plurality of jobs that are executed by a plurality of devices, a comparison section which compares an execution charge of a job that is to be executed within the instruction file execution device of the plurality of jobs included in the instruction file received by the receiver with the usable credit amount received by the receiver, and a job execution section which, if the comparison section determines that the usable credit amount is greater than or equal to the execution charge, executes the job within the instruction file execution device, and if the comparison section determines that the usable credit amount is less than the execution charge, refunds charges for the job flow including jobs that have already been executed by other instruction file execution devices of the plurality of devices;
   a charge collection apparatus for collecting a charge;
   an instruction apparatus which gives notification of a charge collected at the charge collection apparatus to the instruction file execution device, to serve as the usable credit amount, and which sends a predetermined instruction file to the instruction file execution device; and
   a sending section which, after execution of the job, calculates a new value of the usable credit amount by subtracting the execution charge from the usable credit amount, and which sends the new value of the usable credit amount and the instruction file to another instruction file execution device that executes a next job.

15. The job flow system of claim 14, wherein the instruction file execution device further comprises a notification section which, if the usable credit amount is less than the execution charge according to a result of comparison by the comparison section, gives notification of a shortfall amount of the usable credit amount to a predetermined terminal device.

16. The job flow system of claim 15, wherein the job execution section of the instruction file execution device executes the job being handled when the shortfall amount has been collected at the charge collection apparatus.

17. The job flow system of claim 14, wherein the comparison section of the instruction file execution device compares the execution charge with the usable credit amount at least one of before the job execution section commences execution of the job and after commencement of the job but before completion of the job.

18. The job flow system of claim 14, wherein, if the usable credit amount is less than the execution charge according to a result of comparison by the comparison section, the job execution section of the instruction file execution device stops execution of the job being handled.

19. The job flow system of claim 18, wherein, when the instruction file execution device has stopped execution of the job being handled, the charge collection apparatus refunds some or all of a collected charge.

20. The job flow system of claim 14, wherein the job execution section forcibly stops the job when the user does not make a payment within a predetermined time.

21. The job flow system of claim 14, wherein when the comparison section determines that the usable credit amount is less than the execution charge, a user is prompted to submit payment for the amount necessary to fully complete the job.

* * * * *